United States Patent
Kim et al.

(10) Patent No.: US 7,330,421 B2
(45) Date of Patent: Feb. 12, 2008

(54) LASER DIODE DRIVE CONTROL APPARATUS AND METHOD IN OPTICAL STORAGE MEDIUM RECORDING/REPRODUCING SYSTEM

(75) Inventors: Jong-kyu Kim, Gyeonggi-do (KR); Cheon Seong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 795 days.

(21) Appl. No.: 10/237,094

(22) Filed: Sep. 9, 2002

(65) Prior Publication Data
US 2003/0048716 A1 Mar. 13, 2003

(30) Foreign Application Priority Data
Sep. 8, 2001 (KR) .................. 2001-55326

(51) Int. Cl.
*G11B 7/00* (2006.01)
(52) U.S. Cl. .................. 369/116; 369/53.22; 369/47.5
(58) Field of Classification Search .............. 369/116, 369/120, 121, 122, 47.5, 47.44, 47.51, 47.52, 369/47.53, 53.22
See application file for complete search history.

(56) References Cited

U.S. PATENT DOCUMENTS 6,333,909 B1 * 12/2001 Zaima ..................... 369/116
6,510,115 B2 * 1/2003 Furuichi et al. ......... 369/53.22
6,700,846 B2 * 3/2004 Furuichi et al. ......... 369/53.22

FOREIGN PATENT DOCUMENTS

TW 313663 8/1997

* cited by examiner

*Primary Examiner*—Nabil Hindi
(74) *Attorney, Agent, or Firm*—Staas & Halsey LLP

(57) ABSTRACT

A laser diode drive control apparatus and method in an optical storage medium recording/reproducing system. The laser diode drive control apparatus may include: a monitoring unit to measure an actual beam power emitted from a laser diode; a signal level detecting unit to detect a level of a radio-frequency (RF) signal read from the optical storage medium; a clock generator to generate a system clock according to an optical storage medium type of the optical storage medium; a signal formatting unit to form the shape of a signal required during recording, reproducing or erasing operations, using the system clock; a controller to determine the optical storage medium type and to determine whether an error is present in values measured by the monitoring unit and the signal level detecting unit, and to determine a driving frequency of the laser diode based on the determined results; and a drive to drive the laser diode according to the determined driving frequency and the shape of the signal formed by the signal formatting unit. According to the laser diode drive control apparatus and method, it is possible to produce the optimum laser beam suitable for an operation mode of an optical storage medium by applying driving frequency to the optical storage medium in full consideration of optical efficiency and characteristics of the laser diode and the optical storage medium.

16 Claims, 3 Drawing Sheets

LASER DIODE DRIVE CONTROL APPARATUS AND METHOD IN OPTICAL STORAGE MEDIUM RECORDING/REPRODUCING SYSTEM

CROSS-REFERENCE TO RELATED APPLICATIONS

This application claims the benefit of Korean Patent Application No. 2001-55326 filed on Sep. 8, 2001, in the Korean Industrial Property Office, the disclosure of which is incorporated herein by reference.

BACKGROUND OF THE INVENTION

1. Field of the Invention

The present invention relates to an optical power control apparatus and method in an optical storage medium recording/reproducing system, and more particularly, to an optical power control apparatus that generates optical power according to a type of laser diode or operations of the laser diode during optical pickup, and a method of using the same.

2. Description of the Related Art

In general, an optical storage medium reproducing system requires an optical pickup device to provide a physical interface when recording or reproducing data on or from an optical storage medium such as an optical disc. Here, the optical pickup device transmits data to an optical storage medium (recording operation) or reads data contained in a beam reflected from the optical storage medium (reproducing operation), using a laser diode emitting a laser beam. A driver for driving the laser diode controls the intensity of a beam generated by the laser diode, using a high frequency modulator (HFM), that is, a frequency oscillation circuit.

A conventional HFM is turned on when the laser diode is on, generates an oscillating signal having a predetermined frequency, and provides the generated oscillating signal to the laser diode. In general, laser beam power is regularly maintained irrespective of the type of optical storage medium on/from which information is recorded/reproduced or the type of laser diode. However, for optimum recording and reproducing operations of an optical storage medium, the laser beam power must be controlled in consideration of an operational frequency for the type of an optical storage medium and laser diode, and a change in the operational characteristics of the laser diode for frequency shifts of the laser diode.

SUMMARY OF THE INVENTION

To solve the above and other problems, an object of the present invention is to provide a laser beam control apparatus that appropriately generates a laser beam in a laser diode used during an optical pickup operation, in consideration of optical efficiency and characteristics of a laser diode and an optical storage medium, and a method therefor.

Additional objects and advantages of the invention will be set forth in part in the description which follows and, in part, will be obvious from the description, or may be learned by practice of the invention.

To achieve the above and other objects, an optical storage medium recording/reproducing system, including a laser diode drive control apparatus, is provided. The optical storage medium recording/reproducing system includes a laser diode drive control apparatus to produce a driving frequency to drive the laser diode such that a difference between a beam power, which is fed back from a pickup diode (or a laser diode), and a predetermined reference beam power of the pickup diode or laser diode is minimized according to the type of optical storage medium, and the recording mode or reproducing mode of the optical storage medium.

According to an aspect of the present invention, the laser diode drive control apparatus may include: a monitoring unit to measure actual beam power emitted from the laser diode; a signal level detecting unit to detect the level of a radio-frequency (RF) signal read from the optical storage medium; a clock generator to generate a system clock according to the type of the optical storage medium; a signal formatting unit to form the shape of each signal required during recording, reproducing or erasing operations, using the system clock; a controller to check the type of the optical storage medium and whether an error is present in values measured by the monitoring unit and the signal level detecting unit, and to determine driving frequency of the laser diode based on the checked results; and a drive to drive the laser diode according to the determined driving frequency and the shape of the signal formed by the signal formatting unit.

According to another aspect of the present invention, the optical storage medium may be a high-definition digital versatile disc (HD-DVD) or a general DVD.

According to a further aspect of the present invention, the optical storage medium recording/reproducing system may utilize laser diodes having different wavelengths separately selected for a HD-DVD and a general DVD, respectively.

To achieve the above and other objects, a laser diode drive control apparatus to emit a laser beam as a pickup signal to perform a recording or reproducing operation in an optical storage medium is provided. The laser diode drive control apparatus includes: a monitoring unit to measure actual beam power emitted from the laser diode; a signal level detecting unit to detect the level of an RF signal read from the optical storage medium; a clock generator to generate a system clock according to the type of the optical storage medium; a signal formatting unit to form a driving shape and size of a signal during recording, reproducing or erasing operation, using the system clock; a controller to determine the optical storage medium type and whether an error is present in values measured by the monitoring unit and the signal level detecting unit, and to determine a driving frequency of the laser diode; and a drive to drive the laser diode according to the determined driving frequency and the shape of the signal formed by the signal formatting unit.

To achieve the above and other objects, a laser diode drive control method in an optical storage medium recording/reproducing system is provided, with the laser diode drive control method including: checking an optical storage medium type of an optical storage medium used for recording/reproducing operations; selecting a laser diode having a wavelength adapted to the type of the optical storage medium; checking whether an operation mode of the optical storage medium is a recording, reproducing or erasing mode; forming the size and shape of an laser diode drive signal according to the operation mode of the optical storage medium; applying driving frequency selected in consideration of the wavelength of the selected laser diode and the formatted laser diode drive signal as driving signals of the laser diode; measuring actual beam power emitted from the laser diode; and detecting an error in the measured beam power, and changing the applied driving frequency into a new predetermined frequency if any error is detected.

Here, changing the driving frequency into the new predetermined frequency may further include changing a current driving frequency into a new frequency when an error is detected in the level of the RF signal read from the optical storage medium.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
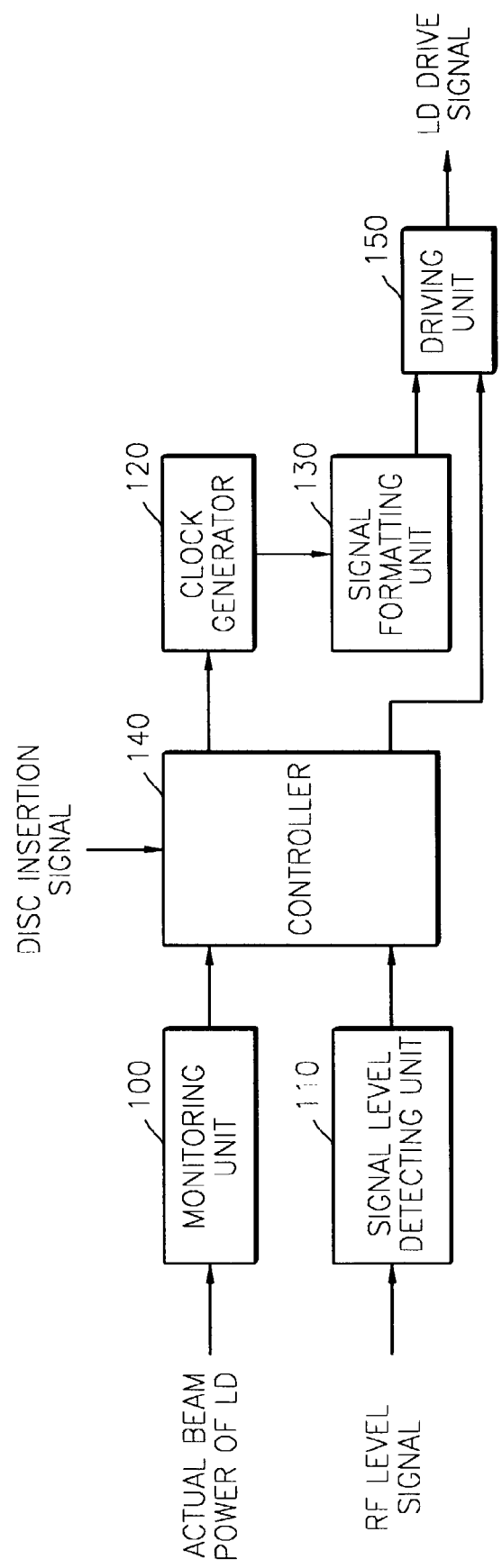
FIG. 1 is an illustration of an embodiment of a laser diode drive control apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 is a view of an embodiment of a laser diode drive control apparatus according to the present invention. Referring to FIG. 1, the laser diode drive control apparatus controls laser diodes used during optical pickup operations when recording and reproducing operations of at least two different types of optical storage media are performed. In this embodiment, a digital versatile disc (DVD) and a high-definition (HD) DVD are described as examples of two different optical storage media only as a matter of convenience.

The laser diode drive control apparatus of FIG. 1 includes a monitoring unit 100, a signal level detecting unit 110, a clock generator 120, a signal formatting unit 130, a controller 140, and a driving unit 150.

Here, the laser diode (LD) (not shown) corresponds to at least one diode that provides a physical interface with an optical storage medium during recording or reproducing operations of the optical storage medium. Data is recorded on and reproduced from the optical storage medium by a laser beam emitted from the laser diode. The size of the laser beam, which is generated during recording and reproducing operations, depends on the type of the optical storage medium. Different optical storage media have different storage capacity, for example, a DVD-RAM (random access memory) has a storage capacity of 4.7 GB while a HD-DVD has a storage capacity of around 15 GB or greater. Their different storage capacity is due to different recording densities, which means that a physical distance between tracks of a HD-DVD is considerably narrower than that between tracks of a DVD-RAM. Accordingly, during recording or reproducing information on or from an optical storage medium, the intensity of a laser beam must be changed according to the type of the optical storage medium. To irradiate different laser beams in size on different optical storage media, diodes of different wavelengths are required. In general, a red laser diode having a laser wavelength of 635 nm is used as for a DVD-RAM, and a blue laser diode having a laser wavelength of 400 nm is used doe a HD-DVD.

The monitoring unit 100 measures, using a photo diode, the actual beam power emitted from the laser diodes, each of which includes one photo diode. The measured beam power is compared with a predetermined reference beam power to check the presence of an error in the measured beam power. A laser beam emitted from the laser diode can be converted into a current value corresponding to the intensity of the laser beam, and the current value can be further converted into an equivalent voltage.

The signal level detecting unit 110 detects the level of a radio-frequency (RF) signal that is read during the playback of the optical storage medium. The detected level of the RF signal is then used in detecting for a malfunction of the executed optical storage medium.

The clock generator 120 generates a system clock according to the type of the optical storage medium. The frequency of the system clock depends on the type of the optical storage medium, and therefore, specifications of the system clock are determined according to the optical storage medium type.

The signal formatting unit 130 determines the shape of a signal when recording, reproducing or erasing data on or from a disc, using the system clock. During a recording operation, the shape and size of the data to be recorded is determined based on the system clock generated by the clock generator 120. During reproducing or erasing data from the optical storage medium, the signal formatting unit 130 determines a regular shape and size of a signal for recording and erasing operations.

The controller 140 checks the type of the optical storage medium, and if an error has been detected by the monitoring unit 100 and/or the signal level detecting unit 110, determines and outputs an appropriate driving frequency of the laser diode. In detail, the type of laser diode is determined depending on whether errors are present in the beam power and the RF signal, and the type of the optical storage medium that is inserted into the optical storage medium recording/reproducing system. Then, driving frequency and the size of a signal are determined in consideration of the wavelength of the specified laser diode.

Hereinafter, the operations of the controller 140 will be described in relation to laser diode drive control.

First, the controller 140 checks the optical storage medium type of an optical storage medium that is inserted into the optical storage medium recording/reproducing system. For instance, a red laser diode having a wavelength of around 635 nm, for example, is selected by the controller 140 if the inserted optical storage medium is a DVD-RAM, and a blue laser diode having a wavelength of around 400 nm, for example, is selected if the optical storage medium is an HD-DVD. In other words, a laser diode is selected based on a proper wavelength for that type of an optical storage medium. The controller 140 calculates a difference (an error) between beam powers of the laser diode measured by the monitoring unit 100 and a predetermined reference value, and generates a new laser diode drive control value to reduce the difference. While the optical storage medium is played back, the controller 140 checks for the presence of an error in the level of the RF signal output from the signal level detecting unit 110, and changes a current control value into a new control value in the event that any error is detected. Here, the control value indicates driving frequency of the laser diode. The current frequency of the laser diode can be changed when a new control value is produced in the case where an error is detected in the actuated optical storage medium or where the actual beam power of the laser diode is different from reference beam power. In other words, the controller 140 can change the frequency of the driving unit 150 until the beam power of the laser diode falls within a predetermined error range with reference to the beam power of the laser diode and such that there is no error in the RF signal level.

The driving unit 150 then actuates the laser diode, using the driving frequency of the laser diode determined by the controller 140 with a signal whose shape is determined by the signal formatting unit 130.

Figure 2:
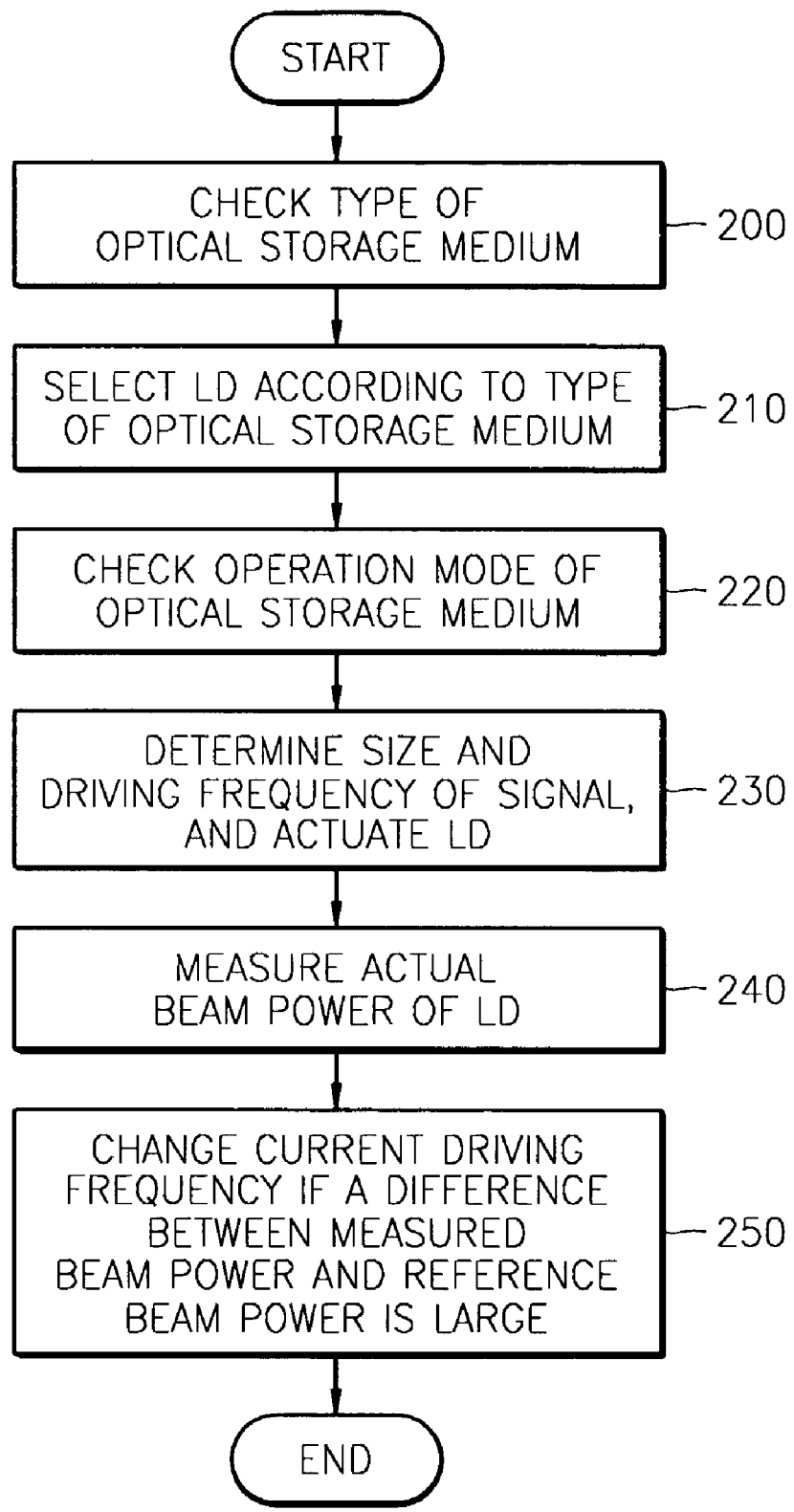
FIG. 2 is a flow chart explaining a laser diode drive control method of the laser diode control apparatus according to an embodiment of the present invention.

FIG. 2 is a flow chart explaining an embodiment of a laser diode (LD) drive control method according to the present invention. According to this method, the type of an optical storage medium inserted into an optical storage medium recording/reproducing system is first checked in operation 200. During operation 200, a laser diode and driving frequency for actuating the laser diode are also selected. Next, in operation 220, it is determined whether an operation mode of the optical storage medium inserted into the optical storage medium recording/reproducing system is a recording mode, a reproducing mode, or an erasing mode. The size and operational frequency of each laser beam signal required during each of the recording, reproducing and erasing modes are determined, and the selected laser diode is actuated according to the determined results in operation 230. In case of the recording mode, formation of a recording signal pattern is included, and the size of a laser beam signal changes according to time, whereas in case of the reproducing and erasing modes, the size of each laser beam signal is regularly maintained irrespective of time change. After operation 230, the actual beam power of the selected laser diode is measured in operation 240. In operation 250, the measured beam power is compared with a predetermined reference beam power of the selected laser diode, and a signal applied to the selected laser diode is controlled in the event that a difference between the measured beam power and the reference beam power is beyond a predetermined error range. Here, when a signal applied to the laser diode is controlled it means that a frequency of the laser diode is controlled. During the reproducing mode of the optical storage medium, the level of an RF signal read from the optical storage medium is compared with a predetermined reference level, and the RF signal may be controlled as in operation 250 in the event that a difference therebetween is large.

Figure 3:
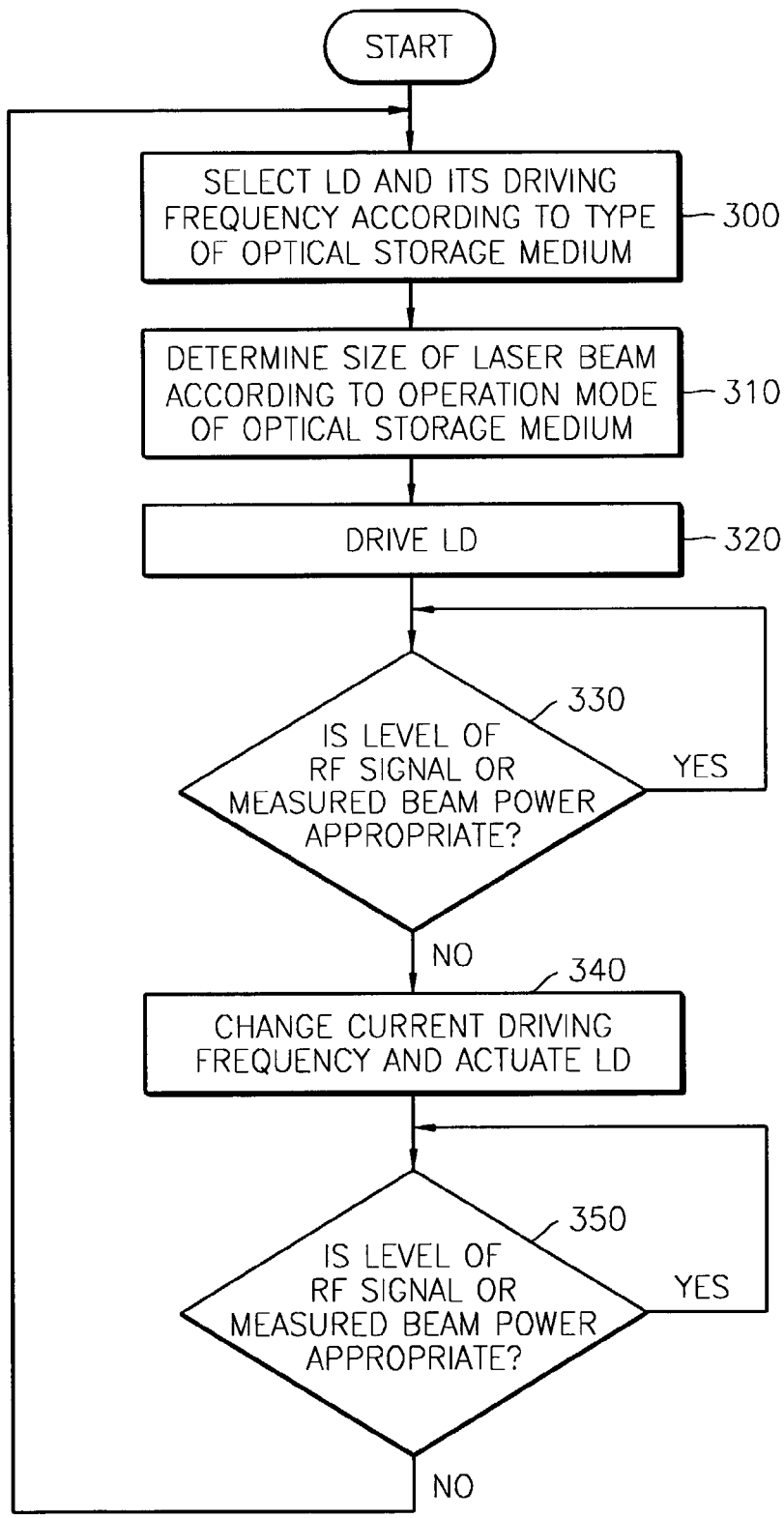
FIG. 3 is a flow chart explaining another laser diode drive control method of the laser diode control apparatus according to another embodiment of the present invention.

FIG. 3 is a flow chart explaining another embodiment of a laser diode drive control method according to the present invention. First, in operation 300, a laser diode (LD) and its driving frequency are selected according to the type of optical storage medium inserted into an optical storage medium recording/reproducing system. Thereafter, in operation 310, the shape and size of a laser beam are determined according to an operation mode of the optical storage medium. Subsequently, in operation 320, the selected laser diode is actuated in consideration of the determined shape and size of the laser beam. Next, in operation 330, beam power emitted from the selected laser diode is measured or the level of an RF signal read from the optical storage medium is detected, and then, it is determined whether the beam power or the level of the RF signal is appropriate. If the beam power or the level of the RF signal is not appropriate in operation 340, the driving frequency of the selected laser diode is calculated so that the optimum beam power or the optimum level of the RF signal is output, and the selected laser diode is again actuated according to the calculated frequency. Next, in operation 350, the beam power of the selected laser diode or the level of an RF signal is measured again, and it determined whether it is appropriate. Nevertheless, if the beam power from the optical storage medium, which is actuated with a new driving frequency, or the level of the RF signal read from the optical storage medium is still improper, operation 300 is returned to and all of the above operations are performed again. If it is determined that values measured during operations 330 through 350 are appropriate, the beam power or the level of the RF signal in operations 330 through 350 is repeatedly reviewed.

As described above, according to the present invention, it is possible to produce an optimum laser beam suitable for an operation mode of an optical storage medium by applying a driving frequency to the laser diode for interaction with the optical storage medium, in full consideration of optical efficiency and characteristics of the laser diode and the optical storage medium.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical storage medium recording and/or reproducing system comprising:

a laser diode drive control apparatus producing a driving frequency for driving a laser diode such that a difference between a beam power, which is fed back from a pickup diode or another laser diode, and a predetermined reference beam power of the pickup diode or the other laser diode is minimized according to a detected optical storage medium type of an optical storage medium and an optical storage medium mode of a recording mode or reproducing mode of the optical storage medium, wherein the laser diode drive control apparatus further comprises a clock generator to generate a system clock according to the optical storage medium type of the optical storage medium, wherein the laser diode is selected from a plurality of laser diodes according to a required size of a laser beam, and wherein the required size of the laser beam is dependent on whether the optical storage medium mode is in the recording mode, reproducing mode, or erasing mode.

2. An optical storage medium recording and/or reproducing system comprising:

a laser diode drive control apparatus to manipulate a driving frequency for driving a laser diode, controlling a beam power of the laser diode, to minimize a difference between a detected beam power, which is fed back from a pickup diode or another laser diode, and a predetermined reference beam power of the pickup diode or the other laser diode according to a detected optical storage medium type of an optical storage medium placed in the system and a corresponding optical storage medium mode, of a plurality of optical storage medium modes including a recording mode and reproducing mode of the optical storage medium, wherein the laser diode drive control apparatus further comprises a clock generator to generate a system clock according to the optical storage medium type of the optical storage medium, and wherein a beam shape or size for at least one recording mode and one reproducing mode is different for a same optical storage medium type.

3. The optical storage medium recording and/or reproducing system of claim 2,
wherein the laser diode drive control apparatus comprises:
a monitoring unit to measure an actual beam power emitted from the laser diode;
a signal level detecting unit to detect a level of a radio-frequency (RF) signal read from the optical storage medium;
a signal formatting unit to form the shape of each signal required during one of the recording, reproducing and an erasing modes of the optical storage medium, using the system clock;
a controller to determine the optical storage medium type and whether an error is present in values measured by the monitoring unit and the signal level detecting unit, and to determine a driving frequency of the laser diode based on the determined optical storage medium type and error presence; and
a drive to drive the laser diode according to the determined driving frequency and the shape of the signal formed by the signal formatting unit.

4. The optical storage medium recording and/or reproducing system of claim 2, wherein the optical storage medium is an HD-DVD or a general DVD.

5. The optical storage medium recording and/or reproducing system of claim 4, wherein the laser diode is selected from a plurality of laser diodes, each having different wavelengths at least for a HD-DVD and a general DVD, respectively.

6. The optical storage medium recording and/or reproducing system of claim 2, wherein the laser diode is selected from a plurality of laser diodes according to a corresponding produced driving frequency of an outputted laser beam.

7. An optical storage medium recording and/or reproducing system comprising:
a laser diode drive control apparatus to manipulate a driving frequency for driving a laser diode, controlling a beam power of the laser diode, to minimize a difference between a detected beam power, which is fed back from a pickup diode or another laser diode, and a predetermined reference beam power of the pickup diode or the other laser diode according to a detected optical storage medium type of an optical storage medium placed in the system and a corresponding optical storage medium mode, of a plurality of optical storage medium modes including a recording mode and reproducing mode of the optical storage medium,
wherein a produced driving frequency of an outputted laser beam is dependent on the optical storage medium type of the optical storage medium and whether the optical storage medium mode is in the one of the recording mode, reproducing mode, and an erasing mode,
wherein a beam shape or size for at least one recording mode and one reproducing mode is different for a same optical storage medium type.

8. An optical storage medium recording and/or reproducing system comprising:
a laser diode drive control apparatus to manipulate a driving frequency for driving a laser diode, controlling a beam power of the laser diode, to minimize a difference between a detected beam power, which is fed back from a pickup diode or another laser diode, and a predetermined reference beam power of the pickup diode or the other laser diode according to a detected optical storage medium type of an optical storage medium placed in the system and a corresponding optical storage medium mode, of a plurality of optical storage medium modes including a recording mode and reproducing mode of the optical storage medium
wherein the driving frequency of the laser diode is changed so that an optimum beam power or optimum level of an RF signal is output, and
wherein a beam shape or size for at least one recording mode and one reproducing mode is different for a same optical storage medium type.

9. The optical storage medium recording and/or reproducing system of claim 2, wherein the laser diode is selected from a plurality of laser diodes according to whether errors are present in a beam power and RF signal and the optical storage medium type.

10. A laser diode drive control apparatus to emit a laser beam as a pickup signal to perform a recording or reproducing operation in an optical storage medium, the laser diode drive control apparatus comprising:
a monitoring unit measuring an actual beam power emitted from a laser diode;
a signal level detecting unit to detect a level of an RF signal read from the optical storage medium;
a clock generator to generate a system clock according to a detected optical storage medium type of the optical storage medium;
a signal formatting unit to selectively format a shape and size of a signal during one of a recording, reproducing, and erasing operation;
a controller to determine the optical storage medium type and whether an error is present in values measured by the monitoring unit and the signal level detecting unit, and to manipulate a driving frequency of the laser diode, controlling an output beam power of the laser diode; and
a drive to drive the laser diode according to the manipulated driving frequency and the shape of the signal formed by the signal formatting unit,
wherein a beam shape or size for at least one recording mode and one reproducing mode is different for a same optical storage medium type.

11. The laser diode drive control apparatus of claim 10, wherein the signal formatting unit formats the shape and size of the signal according to a regular shape and size for recording and erasing operations of the optical storage medium.

12. The laser diode drive control apparatus of claim 10, wherein the signal formatting unit formats the shape and size of the signal according the system clock.

13. A laser diode drive control method in an optical storage medium recording and/or reproducing system, the laser diode drive control method comprising:
checking an optical storage medium type of an optical storage medium;
selecting a laser diode, from a plurality of laser diodes, having a wavelength adapted to the optical storage medium type;
checking whether an operation mode of the optical storage medium is one of a recording, reproducing, and erasing mode;
selectively differently formatting a size and shape of a laser diode drive signal according to the operation mode and the optical storage medium type, with a size or shape of a corresponding laser diode drive signal being different for at least a recording mode and reproducing mode for at least one optical storage medium type;

applying a driving frequency, selected in consideration of a wavelength of the selected laser diode and the formatted laser diode drive signal, as a driving signal of the selected laser diode to control an output beam power of the laser diode;

measuring an actual beam power emitted from the selected laser diode; and detecting an error in the measured beam power, and manipulating the driving frequency into a new predetermined frequency if any error is detected to change the output beam power of the laser diode.

14. The laser diode drive control method of claim 13, wherein the manipulating of the driving frequency into the new predetermined frequency further comprises manipulatincg the driving frequency into a new frequency when an error is detected in a level of an RF signal read from the optical storage medium.

15. The laser diode drive control method of claim 13, wherein the formatting of the signal includes formatting the shape and size of the signal according to a regular shape and size for recording and erasing operations of the optical storage medium.

16. The laser diode drive control method of claim 13, wherein the formatting of the signal includes formatting the shape and size of the signal according to a system clock.

* * * * *

UNITED STATES PATENT AND TRADEMARK OFFICE
CERTIFICATE OF CORRECTION

PATENT NO. : 7,330,421 B2
APPLICATION NO. : 10/237094
DATED : February 12, 2008
INVENTOR(S) : Jong-kyu Kim et al.

It is certified that error appears in the above-identified patent and that said Letters Patent is hereby corrected as shown below:

Column 8, Line 6, after "medium" insert --,--.

Column 8, Line 51, after "according" insert --to--.

Column 10, Line 1-2, change "manipulatincg" to --manipulating--.

Signed and Sealed this

Twenty-sixth Day of August, 2008

JON W. DUDAS
*Director of the United States Patent and Trademark Office*